(12) United States Patent
Li

(10) Patent No.: US 10,237,955 B1
(45) Date of Patent: Mar. 19, 2019

(54) REMOTE CONTROL DEVICE, REMOTE CONTROL TAIL COVER COMPONENT AND FLASHLIGHT

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 15/846,299

(22) Filed: Dec. 19, 2017

(30) Foreign Application Priority Data

Sep. 18, 2017 (CN) .......................... 2017 1 0840854

(51) Int. Cl.
| | | |
|---|---|---|
| F21L 4/00 | (2006.01) | |
| H05B 37/02 | (2006.01) | |
| F21L 4/08 | (2006.01) | |
| F21V 23/00 | (2015.01) | |
| F21V 23/02 | (2006.01) | |
| H02J 7/00 | (2006.01) | |

(52) U.S. Cl.
CPC .......... *H05B 37/0272* (2013.01); *F21L 4/085* (2013.01); *F21V 23/003* (2013.01); *F21V 23/02* (2013.01); *H02J 7/0047* (2013.01); *H02J 7/0052* (2013.01); *H02J 2007/0049* (2013.01); *H02J 2007/0062* (2013.01)

(58) Field of Classification Search
CPC .......... F21L 4/085; F21L 4/08; F21Y 2101/02
USPC ....................................................... 362/183
See application file for complete search history.

(56) References Cited

U.S. PATENT DOCUMENTS

| | | | | |
|---|---|---|---|---|
| 2004/0124637 A1* | 7/2004 | Shah | ..................... | H02K 7/1853 290/1 A |
| 2015/0379866 A1* | 12/2015 | Paek | ...................... | G08C 17/02 340/12.5 |
| 2017/0345290 A1* | 11/2017 | Law | ........................ | G08C 23/04 |

FOREIGN PATENT DOCUMENTS

| | | |
|---|---|---|
| CN | 202511014 U | 10/2012 |
| CN | 202812810 U | 3/2013 |
| CN | 203395605 U | 1/2014 |
| CN | 205196023 U | 4/2016 |

* cited by examiner

*Primary Examiner* — Ahshik Kim
(74) *Attorney, Agent, or Firm* — Schmeiser, Olsen & Watts, LLP (57) ABSTRACT

Provided is a flashlight and a remote control tail cover component, including a remote control device, a control unit and a tail cover; the control unit is arranged in the tail cover and is connected with an external power supply and an external light emitting element; the remote control device includes a remote control shell, a control element and a remote control battery; the remote control shell is provided with a first magnetic charging device which is electrically connected to the remote control battery via the control element; the tail cover is provided with a second magnetic charging device which is connected with the external power supply via the control unit; the control element is in wireless signal connection with the control unit; when the first magnetic charging device and the second magnetic charging device come into contact with each other.

10 Claims, 3 Drawing Sheets

REMOTE CONTROL DEVICE, REMOTE CONTROL TAIL COVER COMPONENT AND FLASHLIGHT

CROSS REFERENCE TO RELATED APPLICATION

This application claims priority to Chinese Application No. 201710840854.4 having a filing date of Sep. 18, 2017, the entire contents of which are hereby incorporated by reference.

FIELD OF TECHNOLOGY

The following relates to the technical field of lighting devices, in particular to a remote control device, a remote control tail cover component and a flashlight.

BACKGROUND

Flashlights which are convenient to carry, easy to use, low in energy consumption, low in cost have become indispensable common lighting tools in people's daily life and work.

In order to bring about convenience for people to control flashlight, some existing flashlights comprise a flashlight body, a light emitting element, a power supply element, a control unit and a remote control tail cover component. The power supply element and the light emitting element are both arranged in the flashlight body and are electrically connected; the control unit is electrically connected with the light emitting element. The remote control tail cover component comprises a tail cover and a remote control device; the tail cover is connected with the flashlight body; the remote control device is in wireless connection with the control unit to further control a flashlight remotely in a wireless way, for example, to control the on/off of the flashlight remotely in a wireless way.

However, when the remote control device is used to control the light emitting element, it is necessary to carry out data matching between the remote control device and the control unit inside the flashlight body manually and then the remote control device can perform wireless signal control to the light emitting element. Manual data matching causes great inconvenience for users due to troublesome operation.

SUMMARY

An aspect relates to a remote control tail cover component and the remote control tail cover component has the advantageous effect that in the case where it is not necessary to carry out manual matching for the remote control device, a remote control battery in the remote control tail cover component can be conveniently charged and data matching for a control element in the remote control tail cover component can be realized.

A remote control tail cover component comprises a remote control device, a control unit and a tail cover; the control unit is arranged in the tail cover and is connected with an external power supply and an external light emitting element; the remote control device comprises a remote control shell, and a control element and a remote control battery which are arranged in the remote control shell;

the remote control shell is provided with a first magnetic charging device which is electrically connected to the remote control battery via the control element; the tail cover is provided with a second magnetic charging device which is matched with the first magnetic charging device; the second magnetic charging device is connected with the external power supply via the control unit; the control element is in wireless signal connection with the control unit;

when the first magnetic charging device and the second magnetic charging device come into contact with each other, through the first magnetic charging device and the second magnetic charging device, it is respectively implemented in different time intervals in a periodic way to charge the remote control battery by the external power supply and carry out data matching between the control unit and the control element.

As compared with the known art, by time share of the first magnetic charging device and the second magnetic charging device, embodiments of the present invention have the advantageous effect that without carrying out manual matching for the remote control device, data matching for the control unit can be realized and the remote control battery in the remote control tail cover component can be conveniently charged; furthermore, the accuracy and uniqueness of the data matching for the control unit are achieved through the interaction of wireless and wired modes.

Further, the data matching process between the control unit and the control element is as follow:

the control element radio broadcasts a matching request message containing its remote control ID; the control unit receives the matching request message and then transmits a response message containing a tail cover ID to the control element through the second magnetic charging device and the first magnetic charging device; the control element receives the response message and then transmits response matching messages containing the remote control ID and the tail cover ID to the control unit in a wireless manner; and the control unit saves the response matching messages containing the remote control ID and the tail cover ID.

Further, the control element comprises a first microcontroller, a first control key, and a first wireless transceiver module; the first control key is protruded on the remote control shell and is electrically connected to the first microcontroller; the first wireless transceiver module is electrically connected to the first microcontroller and interacts with the control unit;

when the first magnetic charging device and the second magnetic charging device come into contact with each other and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each tail cover during next matching and in the case where the first control key is pressed;

if it is detected that the first control key is not pressed, the first microcontroller does not store the current tail cover ID message and only radio broadcasts a newly matched tail cover ID and remote control ID message to a corresponding tail cover during next matching;

stored multiple tail cover IDs and remote control IDs messages are radio broadcasted to each tail cover as follows; the first microcontroller matches multiple tail cover IDs with remote control IDs respectively and continuously transmits messages containing one tail cover ID and one remote control ID one by one until the stored multiple tail cover IDs are all transmitted; each tail cover only receives a tail cover ID and remote control ID message containing its own tail cover ID; or the first microcontroller packs messages containing multiple tail cover IDs and remote control IDs together and radio broadcasts them through the first wireless transceiver module at one time; each tail cover receives the messages containing multiple tail cover tail IDs and remote control IDs and save them together.

Further, when the first magnetic charging device is not in contact with the second magnetic charging device, the first microcontroller also detects whether the first control key is pressed: if it is detected that the first control key is pressed, the first microcontroller transmits a control signal to the control unit through the first wireless transceiver module to control the light emitting element to emit light; when it is detected that the first control key is released, the first microcontroller transmits a control signal to the control unit through the first wireless transceiver module to control the light emitting element to go out.

Further, the first magnetic charging device comprises a first charging block, a first magnetic sheet and a first wedge contact; the first magnetic sheet is arranged at an end part of the first charging block; the first wedge contact is protruded on the first magnetic sheet and is electrically connected to the control element; the second magnetic charging device comprises a second charging block, a second magnetic sheet and a second wedge contact; the second magnetic sheet is fixed at an end part of the second charging block; the second wedge contact is protruded on the second magnetic sheet and is electrically connected to the control unit; by plugging the first wedge contact in the second wedge contact, the second magnetic sheet and the first magnetic sheet are attracted together magnetically to realize data matching between the control unit and the control element.

Moreover, embodiments of the present invention further provides a remote control device, comprising a remote control shell, and a control element and a remote control battery which are arranged in the remote control shell; the remote control shell is provided with a first magnetic charging device which is in contact connection with a tail cover; the first magnetic charging device is electrically connected to the remote control battery via the control element; when the first magnetic charging device and the tail cover are in contact connection, through the first magnetic charging device and the tail cover, it is respectively implemented in different time intervals in a periodic way to charge the remote control battery by an external power supply and carry out data matching between the control element and a control unit;

the data matching process between the control element and the control unit is as follow:

the control element radio broadcasts a matching request message containing its remote control ID;

the control elements receives a response message containing a tail cover ID and transmitted by the control unit through the first magnetic charging device and then transmits response matching messages containing the remote control ID and the tail cover ID to the control unit in a wireless manner so that the control unit saves the response matching messages.

Further, the control element comprises a first microcontroller, a first control key, and a first wireless transceiver module; the first control key is protruded on the remote control shell and is electrically connected to the first microcontroller; the first wireless transceiver module is electrically connected to the first microcontroller;

when the first magnetic charging device and the tail cover are in contact connection and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each control unit during next matching and in the case where the first control key is pressed;

if it is detected that the first control key is not pressed, the first microcontroller does not store the current tail cover ID message and only radio broadcasts a newly matched tail cover ID and remote control ID message to a corresponding control unit during next matching.

Moreover, embodiments of the present invention further provides a flashlight, comprising a flashlight body, a light emitting element, a power supply element, and a remote control tail cover component; the power supply element and the light emitting element are both arranged in the flashlight body and are electrically connected; the remote control tail cover component comprises a tail cover, a control unit and a remote control device; the tail cover is connected with the flashlight body; the control unit is arranged in the tail cover and is electrically connected with the light emitting element; the remote control device comprises a remote control shell, and a control element and a remote control battery which are arranged in the remote control shell;

the remote control shell is provided with a first magnetic charging device which is electrically connected to the remote control battery via the control element; the tail cover is provided with a second magnetic charging device which is matched with the first magnetic charging device; the second magnetic charging device is connected with the power supply element via the control unit; the control element is in wireless signal connection with the control unit;

when the first magnetic charging device and the second magnetic charging device come into contact with each other, through the first magnetic charging device and the second magnetic charging device, it is respectively implemented in different time intervals in a periodic way to charge the remote control battery by the power supply element and carry out data matching between the control unit and the control element.

As compared with the prior art, by time share of the first magnetic charging device and the second magnetic charging device, embodiments of the present invention has the advantageous effect that without carrying out manual matching for the remote control device, data matching for the control unit can be realized and the remote control battery in the remote control tail cover component can be conveniently charged; furthermore, the accuracy and uniqueness of the data matching for the control unit are achieved through the interaction of wireless and wired modes. Further, when the first magnetic charging device and the second magnetic charging device come into contact with each other and when the control element receives the response message containing the tail cover ID and transmitted by the control unit, by pressing the first control key, the control mode where one remote control device controls one light emitting element is switched into the operation mode where one wireless remote control device controls multiple light emitting elements and the operation is convenient and rapid.

Further, the data matching process between the control unit and the control element is as follow: the control element radio broadcasts a matching request message containing its remote control ID; the control unit receives the matching request message and then transmits a response message containing a tail cover ID to the control element through the second magnetic charging device and the first magnetic charging device; the control element receives the response message and then transmits response matching messages containing the remote control ID and the tail cover ID to the control unit in a wireless manner; and the control unit saves the response matching messages containing the remote control ID and the tail cover ID;

the control element comprises a first microcontroller, a first control key, and a first wireless transceiver module; the first control key is protruded on the remote control shell and is electrically connected to the first microcontroller; the first wireless transceiver module is electrically connected to the first microcontroller and interacts with the control unit;

when the first magnetic charging device and the second magnetic charging device come into contact with each other and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each tail cover during next matching and in the case where the first control key is pressed;

if it is detected that the first control key is not pressed, the first microcontroller does not store the current tail cover ID message and only radio broadcasts a newly matched tail cover ID and remote control ID message to a corresponding tail cover during next matching;

stored multiple tail cover IDs and remote control IDs messages are radio broadcasted to each tail covers as follows:

the first microcontroller matches multiple tail cover IDs with remote control IDs respectively and continuously transmits messages containing one tail cover ID and one remote control ID one by one until the stored multiple tail cover IDs are all transmitted; each tail cover only receives a tail cover ID and remote control ID message containing its own tail cover ID; or the first microcontroller packs messages containing multiple tail cover IDs and remote control IDs together and radio broadcasts them through the first wireless transceiver module at one time; each tail cover receives the messages containing multiple tail cover tail IDs and remote control IDs and save them together;

the power supply element comprises a flashlight battery and a USB interface; the flashlight battery is arranged in the flashlight body; the USB interface is arranged on the tail cover and is electrically connected with the flashlight battery and the control unit respectively.

Further, the remote control tail cover component further comprises a USB interface; the USB interface is arranged on the tail cover and is electrically connected with the control unit: when the USB interface is connected with an external power supply and after the first magnetic charging device and the second magnetic charging device come into contact with each other, the external power supply charges the remote control battery, and the external power supply sequentially charges the remote control battery through the control unit, the second magnetic charging device, the first magnetic charging device and the control element;

when the USB interface is not connected with the external power supply and after the first magnetic charging device and the second magnetic charging device come into contact with each other, the power supply element sequentially charges the remote control battery through the control unit, the second magnetic charging device, the first magnetic charging device and the control element.

BRIEF DESCRIPTION OF THE DRAWINGS

Some of the embodiments will be described in detail, with references to the following figures, wherein like designations denote like members, wherein.

DETAILED DESCRIPTION

In the description of embodiments of the present invention, it is to be understood that the orientations or positional relationships, indicated by the terms "center", "longitudinal", "lateral", "upper", "lower", "front", "rear", "left", "right", "vertical", "horizontal", "top", "bottom", "inside", "outside" and the like, are based on the orientations or positional relationships shown in the drawings and are only for the purpose of facilitating and simplifying the description of embodiments of the present invention, rather than indicating or implying that the described device or element must have a particular orientation or must be constructed and operated in a particular orientation, and therefore they cannot to be construed as limiting embodiments of the present invention. In the description of embodiments of the present invention, the meaning of "a plurality of" is two or more, unless otherwise specified.

Figure 1:
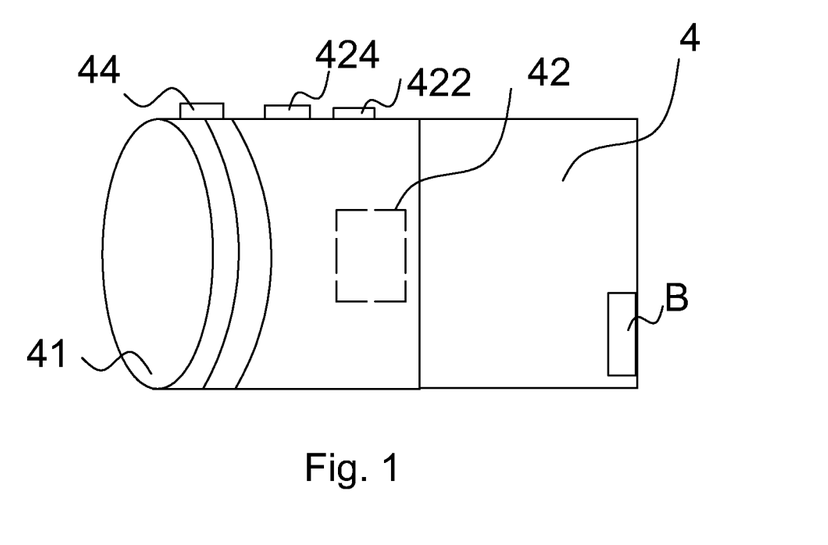
FIG. 1 is a structural schematic diagram of a flashlight body in an embodiment of the present invention.
Figure 2:
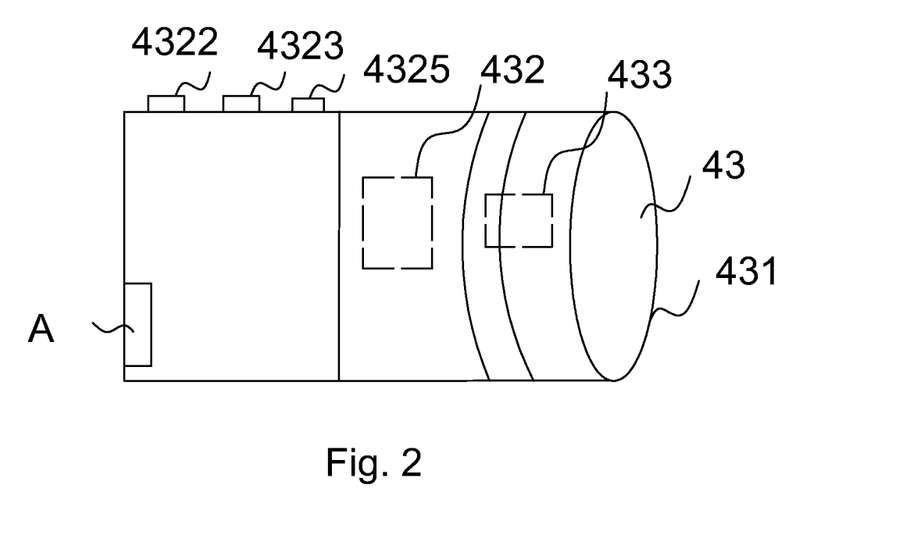
FIG. 2 is a structural schematic diagram of a remote control device in an embodiment of the present invention.
Figure 3:
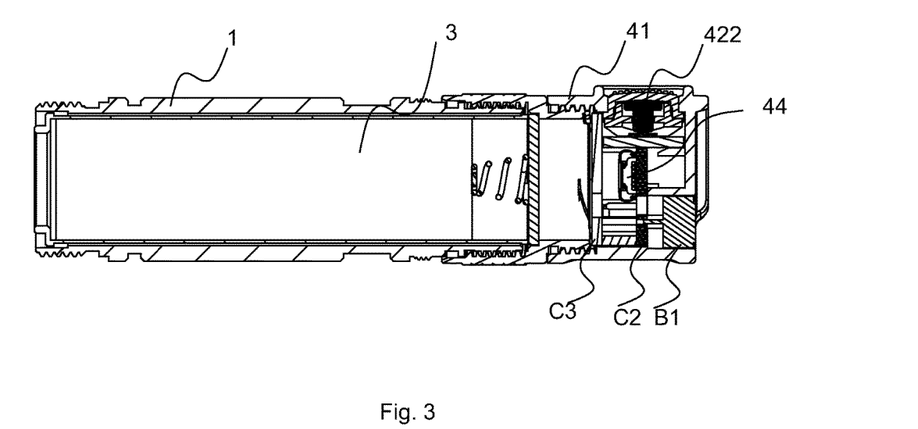
FIG. 3 is a structural principle diagram of the flashlight body in an embodiment of the present invention.
Figure 4:
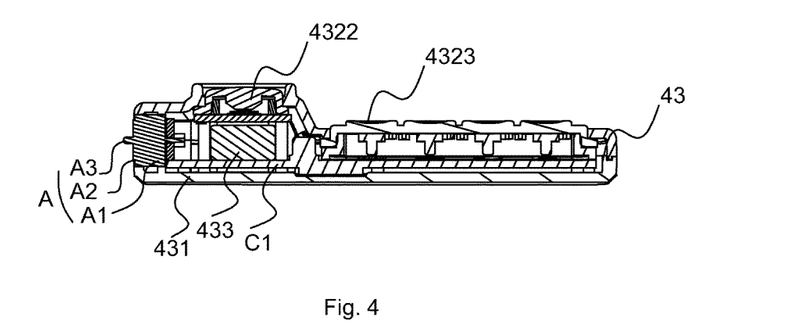
FIG. 4 is a structural principle diagram of the remote control device in an embodiment of the present invention.
Figure 5:
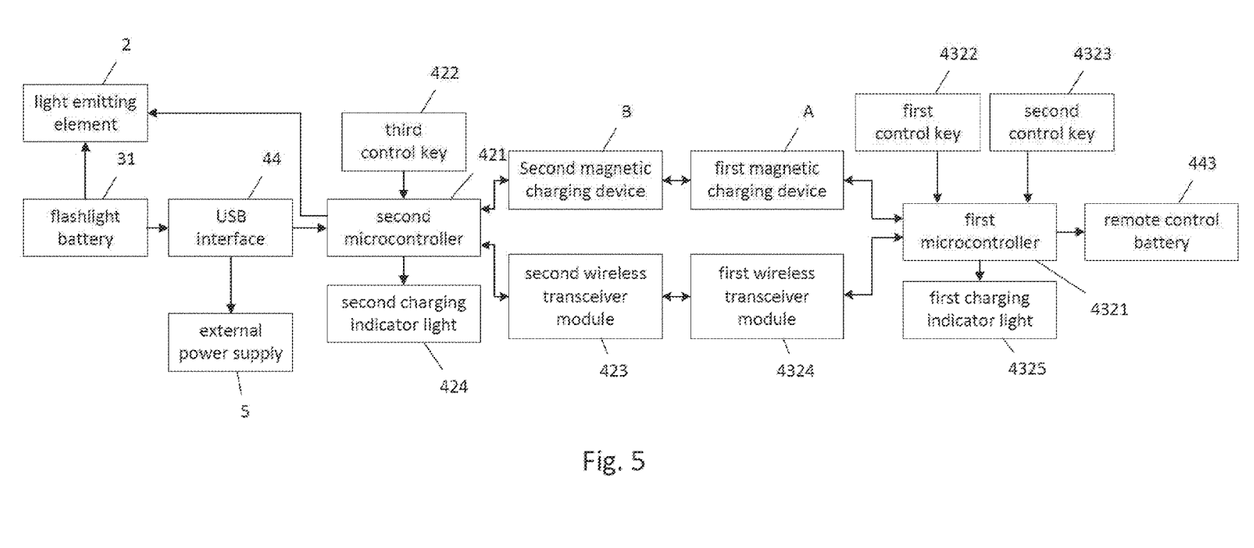
FIG. 5 is a circuit principle diagram of the flashlight body in an embodiment of the present invention.

Further referring to FIGS. 1-5, FIG. 1 is a structural schematic diagram of a flashlight body in an embodiment of the present invention; FIG. 2 is a structural schematic diagram of a remote control device in an embodiment of the present invention; FIG. 3 is a structural principle diagram of the flashlight body in an embodiment of the present invention; FIG. 4 is a structural principle diagram of the remote control device in an embodiment of the present invention; and FIG. 5 is a circuit principle diagram of the flashlight body in an embodiment of the present invention.

The flashlight comprises a flashlight body 1, a light emitting element 2, a power supply element 3 and a remote control tail cover component 4. The power supply element 3 and the light emitting element 2 are both arranged in the flashlight body 1 and are electrically connected. The remote control tail cover component 4 comprises a tail cover 41, a control unit 42, a remote control device 43 and a USB interface 44. The tail cover 41 is connected to the flashlight body 1; the control unit 42 is arranged in the tail cover 41 and is electrically connected with the light emitting element 2. The remote control device 43 is in wireless signal connection with the control unit 42. The USB interface 44 is arranged on the tail cover 41 and is connected with the control unit 42.

The remote control device 43 comprises a remote control shell 431, and a control element 432 and a remote control battery 433 which are arranged in the remote control shell 431. The remote control shell 431 is provided with a first magnetic charging device A which is electrically connected to the remote control battery 433 via the control element 432; the tail cover 41 is provided with a second magnetic charging device B which is matched with the first magnetic charging device A; the second magnetic charging device B is connected with the power supply element 3 via the control unit 42; the control element 432 is in wireless signal connection with the control unit 42.

When the first magnetic charging device A and the second magnetic charging device B come into contact with each other, through the first magnetic charging device A and the second magnetic charging device B, it is respectively implemented in different time intervals in a periodic way to charge the remote control battery 433 by the power supply element 3 and carry out data matching between the control unit 42 and the control element 432.

In an embodiment, by different data input and output by the control unit 42 and the control element 432 in different time intervals, it is implemented to charge the remote control battery 433 by the power supply element 3 or carry out communication data interaction between the control unit 42 and the control element 432. If the remote control battery 433 is charged within 400 ms, the power supply element 3 outputs charging data and sequentially charges the remote control battery 433 through the second magnetic charging device B, the first magnetic charging device A and the control element 432; 400 ms later, the control element 432 radio broadcasts a matching request message containing its remote control ID; the control unit 42 receives the matching request message and then transmits a response message containing a tail cover ID to the control element 432 through the second magnetic charging device B and the first magnetic charging device A; the control element 432 receives the response message and then transmits response matching messages containing the remote control ID and the tail cover ID to the control unit 42 in a wireless manner; and the control unit 42 saves the response matching messages containing the remote control ID and the tail cover ID and carries out data matching in wireless and wired modes; at this moment, if the remote control device 43 is detached from the tail cover 41, the on/off of the light emitting element 2 is controlled by the remote control device without carrying out manual data matching again; if the remote control device 43 is not detached from the tail cover 41, within the following 400 ms, the power supply element 3 outputs charging data through the control unit 42 again and sequentially charges the remote control battery 433 through the second magnetic charging device B, the first magnetic charging device A and the control element 432; such operations are carried out repeatedly in the same way.

In an embodiment, when the USB interface 44 is connected with an external power supply 5, the external power supply 5 may directly charge the remote control battery 433; and after the first magnetic charging device A and the second magnetic charging device B come into contact with each other, the external power supply 5 sequentially charges the remote control battery 433 through the control unit 42, the second magnetic charging device B, the first magnetic charging device A and the control element 432.

In an embodiment, when the USB interface 44 is not connected with the external power supply 5, after the first magnetic charging device A and the second magnetic charging device B come into contact with each other, the power supply element 3 sequentially charges the remote control battery 433 through the control unit 42, the second magnetic charging device B, the first magnetic charging device A and the control element 432.

The first magnetic charging device A comprises a first charging block A1, a first magnetic sheet A2 and a first wedge contact A3. The first magnetic sheet A2 which is a grounding conductor is arranged at the end part of the first charging block A1. The first wedge contact A3 is protruded on the first magnetic sheet A2 and is electrically connected to the control element 432.

The second magnetic charging device B comprises a second charging block B1, a second magnetic sheet and a second wedge contact (not shown in the figures). The second magnetic sheet which is a grounding conductor is fixed at the end part of the second charging block B1. The second wedge contact is protruded on the second magnetic sheet and is electrically connected to the control unit 42; by plugging the first wedge contact A3 in the second wedge contact, the second magnetic sheet and the first magnetic sheet A2 are attracted together magnetically to realize charging and data matching of the remote control device 43.

The tail cover 41 and the remote control shell 431 are both made of plastics. The power supply element 3 is a flashlight battery 31.

In an embodiment, the control element 432 comprises a first microcontroller 4321, a first control key 4322, multiple second control keys 4323, a first wireless transceiver module 4324 and a first charging indicator light 4325. The first control key 4322 and the multiple second control keys 4323 are arranged in parallel, are all protruded on the remote control shell 431, and are respectively connected with the first microcontroller 4321 electrically. The first wireless transceiver module 4324 is electrically connected with the first microcontroller 4321. The first charging indicator light 4325 is electrically connected with the first microcontroller 4321 and is configured to indicate the charging state detected by the first microcontroller 4321.

The first microcontroller 4321 and the first wireless transceiver module 4324 are integrated on a first PCB C1.

According to embodiments of the present invention, the multiple second control keys 4323 are identical in function; due to arrangement of the multiple second control keys 4323, when a user holds the remote control device 43 with a hand, the second control key 4323 at any position can be pressed conveniently to achieve the function of strobe control.

The control unit 42 comprises a second microcontroller 421, a second control key 422, a second wireless transceiver module 423 and a second charging indicator light 424. The third control key 422 is protruded on the tail cover 41 and is electrically connected with the second microcontroller 421. The second wireless transceiver module 423 is electrically connected with the second microcontroller 421. When data matching between the control unit 42 and the control element 432 is successful, a wireless control signal is transmitted to the second microcontroller 421 through the third control key 422 and further the wireless control signal is transmitted to a first wireless module of the control element 432 through the second wireless transceiver module 423. The second charging indicator light 424 is protruded on the tail cover 41 and is electrically connected with the second microcontroller 421 and configured to indicate the charging state detected by the second microcontroller 421. In an embodiment, when the remote control battery 433 of the remote control device 43 is charged, the state of the second charging indicator light 424 is in a slow flashing mode; when the remote control battery 433 of the remote control device 43 is fully charged, the second charging indicator light 424 goes on for a long time; when the remote control battery 433 of the remote control device 43 is charged abnormally, the state of the second charging indicator light 424 is in a quick flashing mode.

In this embodiment, the second microcontroller 421 and the second wireless transceiver module 423 are integrated on a second PCB C2. In this embodiment, a third PCB C3 is further included, and the power supply element 3 is connected with components inside the PCB C2, and other elements may be added to the third PCB C3 later according to function requirements.

When the first magnetic charging device A is not in contact with the second magnetic charging device B, the first microcontroller 4321 also detects whether the first control key 4322 and the second control key 4323 are pressed: if it is detected that the first control key 4322 is pressed, the first microcontroller 4321 transmits a control signal to the control unit 42 through the first wireless transceiver module 4324 to control the light emitting element 2 to emit light; when it is detected that the first control key 4322 is released, the first microcontroller 4321 transmits a control signal to the control unit 42 through the first wireless transceiver module 4324 to control the light emitting element 2 to go out. If it is detected that the second control key 4323 is pressed, the first microcontroller 4321 transmits a control signal to the control unit 42 through the first wireless transceiver module 4324 to control the light emitting element 2 to strobe; when it is detected that the second control key 4323 is released, the first microcontroller 4321 transmits a control signal to the control unit 42 through the first wireless transceiver module 4324 to control the light emitting element 2 to go out.

When the first magnetic charging device A and the second magnetic charging device B come into contact with each other and after the control element 432 receives a response message containing a tail cover ID and transmitted by the control unit 42, the first microcontroller 4321 detects whether the first control key 4322 is pressed; if it is detected that the first control key 4322 is not pressed, the first microcontroller 4321 does not store the current tail cover ID message and only radio broadcasts the newly matched tail cover ID and remote control ID message to a corresponding tail cover 41 during next matching; if it is detected that the first control key 4322 is pressed, the first microcontroller 4321 stores the current tail cover ID message and radio broadcasts the stored multiple tail cover ID and remote control ID messages to each tail cover 41 during next matching when the first control key 4322 is pressed, thus achieving the effect of controlling the light emitting elements 2 of multiple flashlights by one remote control device 43.

In an embodiment, the stored multiple tail cover ID and remote control ID messages are radio broadcasted to each tail cover 41 in the following way: the first microcontroller 4321 packs messages containing multiple tail cover IDs and remote control IDs together and radio broadcasts them through the first wireless transceiver module 4324 at one time; each tail cover 41 receives the messages containing multiple tail cover tail IDs and remote control IDs and save them together.

In another embodiment, the stored multiple tail cover ID and remote control ID messages are radio broadcasted to each tail cover 41 in the following way: the first microcontroller 4321 matches multiple tail cover IDs with remote control IDs respectively and continuously transmits messages containing one tail cover ID and one remote control ID one by one until the stored multiple tail cover IDs are all transmitted; each tail cover 41 only receives a tail cover ID and remote control ID message containing its own tail cover ID.

In an embodiment, when the remote control battery 433 of the remote control device 43 is charged, the state of the first charging indicator light 4325 is in a normally ON red-light mode; when the remote control battery 433 of the remote control device 43 is fully charged, the state of the first charging indicator light 4325 is in a normally ON green-light mode.

In first use, the second wedge contact of the second magnetic charging device is plugged on the first wedge contact of the first magnetic charging device to further electrically connect the control element 432 in the remote control device 43 with the control unit 42, and the remote control device 43 is fixed on the tail cover 41 through the magnetic property of the first magnetic sheet A2 of the first magnetic charging device and the second magnetic sheet of the second magnetic charging device. When the external power supply 5 is connected with the USB interface 44, the power supply element 3 charges the remote control battery 433, and then communication data interaction is carried out between the control unit 42 and the control element 432, and then the process goes back to charge the remote control battery 433 by the power supply element 3; the operations are repeated in the same way, so that the remote control battery 433 is charged, and furthermore the control element 432 and the control unit 42 can also be well matched to realize wireless signal interaction between the control element 432 and the control unit 42, thus achieving the effect of remotely controlling the on/off of the light emitting element 2 in a wireless way without carrying out manual data matching.

As compared with the known art, by time share of the first magnetic charging device and the second magnetic charging device, embodiments of the present invention has the advantageous effect that without carrying out manual matching for the remote control device, data matching for the control unit can be realized and the remote control battery in the remote control tail cover component can be conveniently charged; furthermore, the accuracy and uniqueness of the data matching for the control unit are achieved through the interaction of wireless and wired modes. Further, when the first magnetic charging device and the second magnetic charging device come into contact with each other and when the control element receives the response message containing the tail cover ID and transmitted by the control unit, by pressing the first control key, the control mode where one remote control device controls one light emitting element is switched into the operation mode where one wireless remote control device controls multiple light emitting elements and the operation is convenient and rapid.

The remote control tail cover component according to embodiments of the present invention is not limited to use in a flashlight and it may also be applied to the field of wireless remote control in need of data matching for charging, such as a head lamp; by connecting the remote control tail cover component and a conventional external light emitting element (or elements for making other actions, such as making a sound) with an external power supply, in the case where it is not necessary to carry out manual matching for the remote control device, the remote control battery in the remote control tail cover component can be conveniently charged and data matching for the control element in the remote control tail cover component can be carried out.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A remote control tail cover component, comprising a remote control device, a control unit and a tail cover; the control unit is arranged in the tail cover and is connected with an external power supply and an external light emitting element; the remote control device comprises a remote control shell, and a control element and a remote control battery which are arranged in the remote control shell;

the remote control shell is provided with a first magnetic charging device which is electrically connected to the remote control battery via the control element; the tail cover is provided with a second magnetic charging device which is matched with the first magnetic charging device; the second magnetic charging device is connected with the external power supply via the control unit; the control element is in wireless signal connection with the control unit;

when the first magnetic charging device and the second magnetic charging device come into contact with each other, through the first magnetic charging device and the second magnetic charging device, it is respectively implemented in different time intervals in a periodic way to charge the remote control battery by the external power supply and carry out data matching between the control unit and the control element.

2. The remote control tail cover component according to claim 1, wherein the data matching process between the control unit and the control element is as follow:

the control element radio broadcasts a matching request message containing its remote control ID; the control unit receives the matching request message and then transmits a response message containing a tail cover ID to the control element through the second magnetic charging device and the first magnetic charging device; the control element receives the response message and then transmits response matching messages containing the remote control ID and the tail cover ID to the control unit in a wireless manner; and the control unit saves the response matching messages containing the remote control ID and the tail cover ID.

3. The remote control tail cover component according to claim 2, wherein the control element comprises a first microcontroller, a first control key, and a first wireless transceiver module;

the first control key is protruded on the remote control shell and is electrically connected to the first microcontroller; the first wireless transceiver module is electrically connected to the first microcontroller and interacts with the control unit;

when the first magnetic charging device and the second magnetic charging device come into contact with each other and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each tail cover during next matching and in the case where the first control key is pressed;

if it is detected that the first control key is not pressed, the first microcontroller does not store the current tail cover ID message and only radio broadcasts a newly matched tail cover ID and remote control ID message to a corresponding tail cover during next matching;

stored multiple tail cover IDs and remote control IDs messages are radio broadcasted to each tail cover as follows:

the first microcontroller matches multiple tail cover IDs with remote control IDs respectively and continuously transmits messages containing one tail cover ID and one remote control ID one by one until the stored multiple tail cover IDs are all transmitted;

each tail cover only receives a tail cover ID and remote control ID message containing its own tail cover ID; or the first microcontroller packs messages containing multiple tail cover IDs and remote control IDs together and radio broadcasts them through the first wireless transceiver module at one time; each tail cover receives the messages containing multiple tail cover tail IDs and remote control IDs and save them together.

4. The remote control tail cover component according to claim 3, wherein when the first magnetic charging device is not in contact with the second magnetic charging device, the first microcontroller also detects whether the first control key is pressed: if it is detected that the first control key is pressed, the first microcontroller transmits a control signal to the control unit through the first wireless transceiver module to control the light emitting element to emit light; when it is detected that the first control key is released, the first microcontroller transmits a control signal to the control unit through the first wireless transceiver module to control the light emitting element to go out.

5. The remote control tail cover component according to claim 1, wherein the first magnetic charging device comprises a first charging block, a first magnetic sheet and a first wedge contact; the first magnetic sheet is arranged at an end part of the first charging block; the first wedge contact is protruded on the first magnetic sheet and is electrically connected to the control element; the second magnetic charging device comprises a second charging block, a second magnetic sheet and a second wedge contact; the second magnetic sheet is fixed at an end part of the second charging block; the second wedge contact is protruded on the second magnetic sheet and is electrically connected to the control unit; by plugging the first wedge contact in the second wedge contact, the second magnetic sheet and the first magnetic sheet are attracted together magnetically to realize data matching between the control unit and the control element.

6. A remote control device, comprising a remote control shell, and a control element and a remote control battery which are arranged in the remote control shell; the remote control shell is provided with a first magnetic charging device which is in contact connection with a tail cover; the first magnetic charging device is electrically connected to the remote control battery via the control element; when the first magnetic charging device and the tail cover are in contact connection, through the first magnetic charging device and the tail cover, it is respectively implemented in different time intervals in a periodic way to charge the remote control battery by an external power supply and carry out data matching between the control element and a control unit;

the data matching process between the control element and the control unit is as follow:

the control element radio broadcasts a matching request message containing its remote control ID;

the control element receives a response message containing a tail cover ID and transmitted by the control unit through the first magnetic charging device and then transmits response matching messages containing the remote control ID and the tail cover ID to the control unit in a wireless manner so that the control unit saves the response matching messages.

7. The remote control device according to claim 6, wherein the control element comprises a first microcontroller, a first control key, and a first wireless transceiver module; the first control key is protruded on the remote control shell and is electrically connected to the first microcontroller; the first wireless transceiver module is electrically connected to the first microcontroller;

when the first magnetic charging device and the tail cover are in contact connection and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each control unit during next matching and in the case where the first control key is pressed;

if it is detected that the first control key is not pressed, the first microcontroller does not store the current tail cover ID message and only radio broadcasts a newly matched tail cover ID and remote control ID message to a corresponding control unit during next matching.

8. A flashlight, comprising a flashlight body, a light emitting element, a power supply element, and a remote control tail cover component; the power supply element and the light emitting element are both arranged in the flashlight body and are electrically connected; the remote control tail cover component comprises a tail cover, a control unit and a remote control device; the tail cover is connected with the flashlight body; the control unit is arranged in the tail cover and is electrically connected with the light emitting element; the remote control device comprises a remote control shell, and a control element and a remote control battery which are arranged in the remote control shell;

the remote control shell is provided with a first magnetic charging device which is electrically connected to the remote control battery via the control element; the tail cover is provided with a second magnetic charging device which is matched with the first magnetic charging device; the second magnetic charging device is connected with the power supply element via the control unit; the control element is in wireless signal connection with the control unit;

when the first magnetic charging device and the second magnetic charging device come into contact with each other, through the first magnetic charging device and the second magnetic charging device, it is respectively implemented in different time intervals in a periodic way to charge the remote control battery by the power supply element and carry out data matching between the control unit and the control element.

9. The flashlight according to claim 8, wherein the data matching process between the control unit and the control element is as follow: the control element radio broadcasts a matching request message containing its remote control ID; the control unit receives the matching request message and then transmits a response message containing a tail cover ID to the control element through the second magnetic charging device and the first magnetic charging device; the control element receives the response message and then transmits response matching messages containing the remote control ID and the tail cover ID to the control unit in a wireless manner; and the control unit saves the response matching messages containing the remote control ID and the tail cover ID;

the control element comprises a first microcontroller, a first control key, and a first wireless transceiver module; the first control key is protruded on the remote control shell and is electrically connected to the first microcontroller; the first wireless transceiver module is electrically connected to the first microcontroller and interacts with the control unit;

when the first magnetic charging device and the second magnetic charging device come into contact with each other and when the control element receives the response message containing the tail cover ID and transmitted by the control unit, the first microcontroller detects whether the first control key is pressed:

if it is detected that the first control key is pressed, the first microcontroller stores the current tail cover ID message and radio broadcasts stored multiple tail cover IDs and remote control IDs messages to each tail cover during next matching and in the case where the first control key is pressed;

if it is detected that the first control key is not pressed, the first microcontroller does not store the current tail cover ID message and only radio broadcasts a newly matched tail cover ID and remote control ID message to a corresponding tail cover during next matching;

stored multiple tail cover IDs and remote control IDs messages are radio broadcasted to each tail covers as follows:

the first microcontroller matches multiple tail cover IDs with remote control IDs respectively and continuously transmits messages containing one tail cover ID and one remote control ID one by one until the stored multiple tail cover IDs are all transmitted;

each tail cover only receives a tail cover ID and remote control ID message containing its own tail cover ID; or the first microcontroller packs messages containing multiple tail cover IDs and remote control IDs together and radio broadcasts them through the first wireless transceiver module at one time; each tail cover receives the messages containing multiple tail cover tail IDs and remote control IDs and save them together;

the power supply element comprises a flashlight battery and a USB interface; the flashlight battery is arranged in the flashlight body; the USB interface is arranged on the tail cover and is electrically connected with the flashlight battery and the control unit respectively.

10. The flashlight according to claim 8, wherein the remote control tail cover component further comprises a USB interface; the USB interface is arranged on the tail cover and is electrically connected with the control unit:

when the USB interface is connected with an external power supply and after the first magnetic charging device and the second magnetic charging device come into contact with each other, the external power supply charges the remote control battery, and the external power supply sequentially charges the remote control battery through the control unit, the second magnetic charging device, the first magnetic charging device and the control element;

when the USB interface is not connected with the external power supply and after the first magnetic charging device and the second magnetic charging device come into contact with each other, the power supply element sequentially charges the remote control battery through the control unit, the second magnetic charging device, the first magnetic charging device and the control element.

* * * * *